Figure 1:
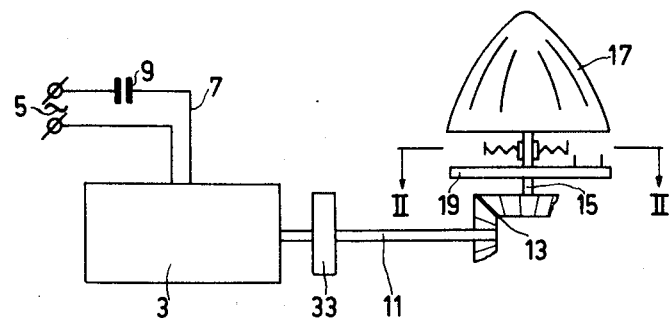

United States Patent [19]

Diefenbach et al.

[11] Patent Number: 4,486,697
[45] Date of Patent: Dec. 4, 1984

[54] REVERSING DEVICE FOR A TWO-POLE SINGLE-PHASE SYNCHRONOUS MOTOR

[75] Inventors: Gerhard Diefenbach, Aachen, Fed. Rep. of Germany; Erich Krainer, St. Veit an der Glaan, Austria

[73] Assignee: U.S. Philips Corporation, New York, N.Y.

[21] Appl. No.: 496,703

[22] Filed: May 20, 1983

[30] Foreign Application Priority Data

Sep. 18, 1982 [DE] Fed. Rep. of Germany ....... 3234717

[51] Int. Cl.³ ............................................. H02P 3/18
[52] U.S. Cl. ....................................... 318/703; 99/501
[58] Field of Search ............. 318/136, 160, 739, 741, 318/245, 127, 759, 282, 286, 702, 703; 310/162; 99/501–504

[56] References Cited

U.S. PATENT DOCUMENTS

| 2,105,514 | 1/1938 | Welch | 318/739 |
| 2,613,342 | 10/1952 | Thompson et al. | 318/759 |
| 3,548,276 | 12/1970 | Gross | 318/245 |
| 3,667,651 | 6/1972 | Shapiro | 318/286 |

*Primary Examiner*—David Smith, Jr.
*Attorney, Agent, or Firm*—Robert T. Mayer; Bernard Franzblau

[57] ABSTRACT

A reversing device for a two-pole single-phase synchronous motor (3) without a starting coil. The motor comprises a diametrically magnetized permanent-magnet rotor having a shaft that runs against elastic stops for reversing the direction of rotation, and a capacitor arranged in series with the stator exciter coil. The capacitor serves for improving the reversing operation and is dimensioned so that its reactance at the AC supply frequency is greater than the reactance of the exciter coil of the synchronous motor.

16 Claims, 4 Drawing Figures

U.S. Patent     Dec. 4, 1984     4,486,697

REVERSING DEVICE FOR A TWO-POLE SINGLE-PHASE SYNCHRONOUS MOTOR

This invention relates to a reversing device for a two-pole single-phase synchronous motor without a starting auxiliary coil, which motor comprises a diametrically magnetized permanent-magnet rotor whose shaft runs against stops for reversing the direction of rotation, and a capacitor arranged in series with the stator exciter coil.

In various machines and appliances the direction of movement is or is to be reversed automatically at regular or irregular time intervals. For example, a small citrus press is known (AT-PS No. 355 752) in which the direction of rotation of the pressing cone is reversed after substantially every three quarters of a revolution. This improves the pressing result.

A single-phase synchronous motor with a permanent magnet rotor has the property that statistically it is capable of starting and running in either direction. Because of the high transmission ratio when used in a citrus press the motor has to perform many reversals, i.e. assume and run in the stable condition, for said pressing-cone movement of substantially three quarters of a revolution. In order to reverse the direction of rotation of the pressing cone and of the motor there may be provided a number of more or less elastic stops against which the gear wheel which drives the pressing cone runs alternately in the positive or negative direction of rotation, so that in order to reverse the direction of rotation, the motor is overloaded to such an extent that it stalls and then starts again in the opposite direction. Stalling and starting in the other direction of rotation should be effected rapidly and the starting problems inherent in the single-phase synchronous motor, which problems may give rise to a number of undesired reversals under certain circumstances, should be precluded. Otherwise, the operation of the pressing cone will be disturbed (so-called hesitation) with irregular, jerky movements (sputtering) accompanied by noise.

It is an object of the invention to provide a reversing device in which reversal is effected in a reliable manner without sputtering, i.e. in which the stable condition is reached rapidly and without problems.

According to the invention this object is achieved in that the reactance of the capacitor at the AC supply frequency is higher than the reactance of the exciter coil, so that the capacitor values comply with $$\frac{\omega L - \frac{1}{\omega C}}{R} < 0$$

in which
- $\omega$ is the angular AC supply frequency,
- $L$ the coil inductance,
- $C$ the series capacitance,
- $R$ the non-reactive motor resistance.

This means that the capacitor is dimensioned so that the series resonant circuit comprising the capacitor, coil inductance and coil resistance becomes highly capacitive. It is then particularly favourable if, in accordance with a further embodiment of the invention, the operating current for the exciter coil with capacitor has substantially the same effective value as the operating current without series capacitor, because the motor is then warmed up to the same extent.

The pressing-cone movement of a citrus press will now be reversed without problems. The stability problems associated with single-phase synchronous motors (DE-PS No. 26 12 851) do not occur. The stable condition is reached rapidly and without problems.

It is known that the starting behaviour and the stable operation of single-phase synchronous motors can be improved by increasing the ohmic resistance (Philips Research Reports Suppl. 1971, No. 5, page 98), sometimes by the use of a series resistor (DE-PS No. 26 12 851).

In DE-PS No. 26 12 851 (column 3, lines 12 to 18) a series resistor is included during the starting phase in order to suppress the 33⅓ Hz interference (and thus the adjacent range in which starting problems occur, accompanied by reversal of the direction of rotation), and in general to shift sub-harmonic resonances beyond the operating range, or as in the case of the 25 Hz resonance and the corresponding unstable swinging ranges, to eliminate these completely by further increasing the value of the series resistor. The actual starting movement with the associated stalling is not considered in said Patent Specification. The series resistor in the starting phase generally leads to a substantial reduction of the stalling power. Therefore, the series resistor is generally bypassed after starting. This may be omitted only if the residual power suffices. The steps described in said Patent Specification also have a positive effect, in the case where the synchronous motor drives a reversing mechanism of the present type. However, this solution remains problematic and unreliable if a correct direction of reversal is required over a wide range of voltages and load-parameter tolerances.

It is known to employ a capacitor in conjunction with a single-phase synchronous motor. For example, a capacitor is used in the operating circuit of a single-phase synchronous motor described in DE-PS No. 14 38 569. However, in this case the capacitor only serves to dimension the motor for maximum power output. According to the inventor's statements in ETZ-A, 87, March 1966, pages 171 to 175 Eq. 11, it is then required that $$\frac{E}{U} = \frac{1}{2 \cos \alpha}$$

where
- $E$ = the induced voltage
- $U$ = the applied voltage
- $\alpha$ = arc tan $$\alpha = \arctan \frac{\omega L - \frac{1}{\omega C}}{R} = \text{phase angle of the circuit}$$

- $\omega$ = the circular AC supply frequency
- $C$ = the series capacitor
- $R$ = the non-reactive motor resistance
- $L$ = the coil inductance.

DE-PS No. 14 38 569 specifically mentions values for tan $\alpha$ between 0 and 5, that is inductive circuits, which also remain inductive when a capacitor is arranged in series. The same applies to the capacitor used in DE-Patent Application No. P 31 41 633.3. In the case of motor load systems which should be loaded dynamically up to the actual maximum power, this capacitor serves to increase the maximum dynamic power. The use of a capacitor is only in conformity with this inventive concept if the total phase angle is not reduced too far below the value which corresponds to the dynamically permissible angular area $F_{Cu,dyn}$. Otherwise the power output rapidly decreases below the value $P_{ab,dyn}$ which is possible at the specified permissible power dissipation. Also in this case negative phase angles were not considered.

In addition to the series resistor DE-PS No. 26 13 851 inter alia also mentions a capacitor or a combination of a capacitor and a resistor for starting purposes. The object of these additional elements is again to shift the subharmonic resonances or to damp the 25 Hz interference and adjacent unstable ranges. The actual starting movement with associated stalling is not considered in the Patent Specification. As can be seen, this starting movement is not improved by including a capacitor which serves for shifting the unstable ranges. In addition, it is apparent from the entire context that only comparatively small changes of the impedances are envisaged, as necessary in order to shift the unstable and stable ranges beyond the operating region. Changing the inductive properties of the circuit has neither been intended nor implied.

By the use of a capacitor dimensioned in accordance with the invention, the attainable stalling power may be reduced. In a further embodiment of the invention the capacitor is disconnectable during motor operation between the points of reversal. For this purpose, there is provided a switch; which may be a mechanical or an electronic switch, but which may alternatively comprise a non-linear temperature-dependent resistor.

For the purpose of current limiting, in accordance with a further embodiment of the invention, an additional resistor was arranged in series with the capacitor.

It is found that a further optimization of the drive mechanism is possible by changing the mass moment of inertia. It may then be favourable if inertial elements in the form of discs or weights are arranged in the drive mechanism, for example on the motor shaft.

Figure 2:
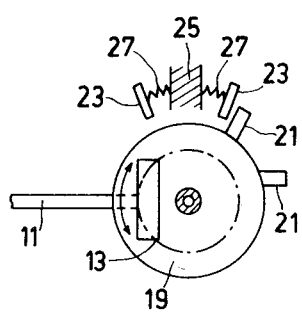
Figure 3:
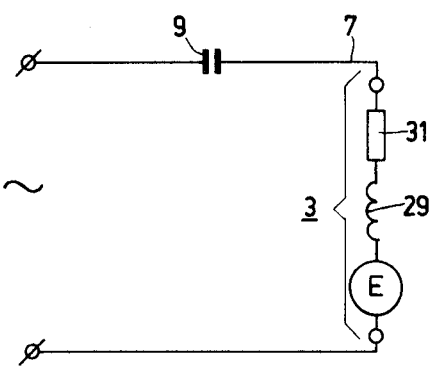
Figure 4:
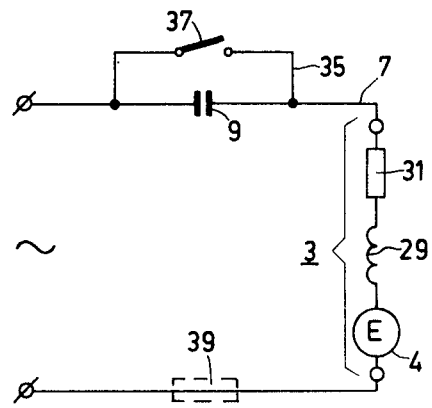

Embodiments of the invention will now be described in more detail, by way of example, with reference to the drawing. In the drawing:

FIG. 1 represents the principle of a drive mechanism for the pressing cone of a citrus press driven by a single-phase synchronous motor with a permanent-magnet rotor and without an auxiliary coil, the direction of rotation of the pressing cone being reversed continually, FIG. 2 is a plan view of the mechanical reversing device of the pressing-cone drive mechanism, FIG. 3 shows a reversing circuit for the single-phase synchronous motor, and FIG. 4 is a modification of the circuit shown in FIG. 3.

A single-phase synchronous motor 3 with a permanent-magnet rotor and without an auxiliary coil may be connected to a single-phase a.c. supply 5. In the supply line 7 of the single-phase synchronous motor a capacitor 9 is arranged, which serves to obtain an intentional reversal of the direction of rotation of the single-phase synchronous motor.

Via a bevel gear 13 the drive shaft 11 of the single-phase synchronous motor 3 drives the shaft 15 of the pressing cone 17 of a citrus press. On the shaft 15 a reversing disc 19 is arranged, FIG. 2 being a plan view of the disc along the line II—II in FIG. 1.

The reversing disc 19 is provided with stop cams 21 which cooperate with stops 23. The stops 23 are resilient and, in order to obtain this resilient action, they act on the housing 25 via pressure springs 27.

A single-phase synchronous motor with a permanent-magnet rotor and without an auxiliary coil does not have a fixed starting direction. If it encounters a braking moment which causes it to stall, it changes over and can start again in the opposite direction of rotation. In the present case this property is utilized for driving the pressing cone of a citrus press whose direction of rotation should change continually in a constant rhythm. Because of the starting properties of the single-phase synchronous motor the pressing cone rotation should merely be stopped in order to bring about a reversal of the direction of rotation of the single-phase synchronous motor.

In order to ensure that the single-phase synchronous motor starts smoothly and immediately upon the reversal of the direction of rotation at the points of reversal at the stops 23, the capacitor 9 is arranged in the power-supply line 7. FIG. 3 shows the power-supply circuit for the synchronous motor 3. The capacitor 9 is arranged in the power-supply line. In series with the capacitor 9 the single-phase synchronous motor 3 is arranged. The equivalent diagram of the motor includes the ohmic coil resistance 31, the coil inductance 29 and the EMF 4. The capacitor 9 is dimensioned so that the reactance of the capacitor at the AC supply frequency is higher than the reactance of the exciter coil. This means that the capacitor 9 is dimensioned so that the series resonant circuit comprising the capacitor 9, the coil inductance 29 and the coil resistance 31 becomes highly capacitive. This precludes the so-called sputtering upon the reversal and thus a hesitation or fluttering of the pressing cone upon starting.

The circuit is dimensioned so that $$\tan\frac{\omega L - \frac{1}{\omega C}}{R} < 0$$

The operating current for the exciter coil with capacitor then suitably has an effective value corresponding to the effective value of the operating current without a series capacitor because the motor is warmed up to the same extent.

If the direction of rotation in which the rotor can be pulled out of the parallel position by the magnetic detent torque is assumed to be the positive direction of rotation, the design of the stop springs 27, in particular their resilience should be such that for starting from the end and reversal point in the positive direction of rotation near the parallel position the sum of the spring torque and the detent torque is greater than the friction torque. For starting from the positive end or reversal point in the negative direction of rotation it follows that near the parallel position the difference of the spring torque and the detent torque should be greater than the friction torque.

The elasticity of the stops 23 is also of advantage for the dynamic operation because during normal reversing operation the kinetic energy of the system is stored in the springs and the springs consequently accelerate the rotor in the opposite direction.

In order to improve the properties of the drive mechanism, a disc 33 is arranged on the shaft 11. This disc 33 changes the mass moment of inertia of the drive mechanism.

In FIG. 4 the capacitor 9 is shunted by a parallel line 35 in which a switch 37 is arranged. This switch 37 is always closed when the synchronous motor 3 runs between the points of reversal defined by the stops 23. In this way the capacitor 9, which only serves for reversal, does not present a load to the drive mechanism during the rotation of the pressing cone. The switch 37 may be a mechanical or an electronic switch, but may alternatively comprise an additional non-linear temperature-dependent resistor.

In FIG. 4 a further resistor 39 is represented by a broken line, which resistor may be arranged in the supply line 7. Such an additional resistor provides a more stable starting behaviour.

What is claimed is:

1. A reversing device for a two-pole single-phase synchronous motor without a starting auxiliary coil, which motor comprises a diametrically magnetized permanent-magnet rotor, whose shaft runs against stops for reversing the direction of rotation, and a capacitor connected in series with the stator exciter coil, characterized in that the reactance of the capacitor at the AC supply frequency is higher than the reactance of the exciter coil, so that the capacitor values comply with:

$$\frac{\omega L - \frac{1}{\omega C}}{R} < 0$$

in which
ω=the angular supply frequency,
L=the coil inductance
C=the series capacitance
R=the non-reactive motor resistance.

2. A reversing device as claimed in claim 1, wherein the operating current for the exciter coil and capacitor has substantially the same effective value as the operating current without a series capacitor.

3. A reversing device as claimed in claim 1, wherein the capacitor is disconnectable during motor operation between the points of reversal.

4. A reversing device as claimed in claim 1, further comprising an additional resistor connected in series with the capacitor.

5. A reversing device as claimed in claim 1 further comprising an additional inertial element arranged on the motor shaft.

6. A reversing device as claimed in claim 1 further comprising a reversing disc equipped with stop cams.

7. A reversing device as claimed in claim 6 for use with a citrus press including a pressing cone having a shaft coupled to the rotor shaft, characterized in that the reversing disc is arranged directly on the pressing-cone shaft.

8. A reversing device as claimed in claim 1, characterized in that the reversing stops are elastic.

9. A reversing device as claimed in claim 1 further comprising a switching element connected across the capacitor and operative intermediate the points of reversal to shortcircuit the capacitor.

10. A reversible electric motor drive comprising: a self-starting single-phase synchronous motor including a diametrically magnetized permanent-magnet rotor and absent any auxiliary starting winding, said motor having a stator exciter winding and being self-starting and operable in either direction of rotation, and means for reversing the motor direction of rotation comprising resilient stop means for stalling the motor at given points in its range of rotation and a capacitor connected in series with the stator exciter winding to terminals for a single phase AC supply voltage, the reactance of said capacitor being greater than the reactance of the stator exciter winding at the frequency of the AC supply voltage thereby to improve the reversing operation of the motor at said given points.

11. A reversible motor drive as claimed in claim 10 wherein the stator exciter winding and capacitor are dimensioned so that the operating current for the stator winding and the capacitor has substantially the same effective value as it would have without the capacitor.

12. A reversible motor drive as claimed in claim 10 further comprising means for disconnecting the capacitor during operation of the motor between said given points of reversal and in a manner so as to connect the stator exciter winding directly to the AC supply terminals.

13. A reversible motor drive as claimed in claim 12 wherein said disconnecting means comprises a switching device connected in parallel with the capacitor and selectively operated into its closed condition between said given points of reversal.

14. A reversible motor drive as claimed in claim 10 further comprising a resistor connected in series with the capacitor and the stator winding and dimensioned to improve the starting characteristic of the motor.

15. A reversible motor drive as claimed in claim 10 wherein the series circuit of the stator winding and the capacitor are directly connected to the AC supply voltage terminals.

16. A reversible motor drive as claimed in claim 10 wherein the capacitor is connected in series with the stator winding to the AC supply voltage terminals at least during start-up of the motor.

* * * * *

UNITED STATES PATENT AND TRADEMARK OFFICE
CERTIFICATE OF CORRECTION

PATENT NO. : 4,486,697
DATED : December 4, 1984
INVENTOR(S) : GERHARD DIEFENBACH ET AL It is certified that error appears in the above-identified patent and that said Letters Patent is hereby corrected as shown below:

Column 2, line 50, please cancel "a=arc tan"

Signed and Sealed this

Seventeenth Day of December 1985

[SEAL]

Attest:

DONALD J. QUIGG

Attesting Officer

Commissioner of Patents and Trademarks